(12) United States Patent
Kolahi et al.

(10) Patent No.: US 7,318,356 B2
(45) Date of Patent: *Jan. 15, 2008

(54) METHOD FOR OPERATING A MASS FLOW METER

(75) Inventors: Kourosh Kolahi, Kiel (DE); Ralf Storm, Essen (DE)

(73) Assignee: Krohne AG, Basel (CH)

( * ) Notice: Subject to any disclaimer, the term of this patent is extended or adjusted under 35 U.S.C. 154(b) by 170 days.

This patent is subject to a terminal disclaimer.

(21) Appl. No.: 11/283,107

(22) Filed: Nov. 18, 2005

(65) Prior Publication Data

US 2006/0112774 A1 Jun. 1, 2006

(30) Foreign Application Priority Data

Dec. 1, 2004 (DE) ............ 10 2004 058 094
Mar. 22, 2005 (DE) ............ 10 2005 013 770

(51) Int. Cl.
*G01F 1/84* (2006.01)

(52) U.S. Cl. ............................................. 73/861.357

(58) Field of Classification Search ......... 73/861.356, 73/861.355, 861.357

See application file for complete search history.

(56) References Cited

U.S. PATENT DOCUMENTS

| 5,497,665 | A | 3/1996 | Cage et al. |
| 5,734,112 | A | 3/1998 | Bose et al. |
| 6,332,366 | B1 | 12/2001 | Wray |
| 6,763,730 | B1 | 7/2004 | Wray |
| 2003/0070495 | A1 | 4/2003 | Kolahi |
| 2004/0187599 | A1 | 9/2004 | Drahm et al. |
| 2006/0096390 | A1* | 5/2006 | Kolahi et al. ........ 73/861.356 |

* cited by examiner

*Primary Examiner*—Jewel Thompson
(74) *Attorney, Agent, or Firm*—Cesari and McKenna, LLP

(57) ABSTRACT

A method for operating a mass flowmeter that employs the Coriolis principle and through which flows a medium, the flowmeter including a measuring tube through which passes a medium, which measuring tube is stimulated into oscillating and the resulting oscillatory response of the measuring tube is measured includes the step of gauging the pressure of the medium flowing through the measuring tube by evaluating the collected oscillatory response on the basis of a physical-mathematical model for the dynamics of the mass flowmeter. Thus, without requiring any additional devices, it is possible for a Coriolis mass flowmeter, apart from measuring the mass flow, to also measure the pressure in the measuring tube.

11 Claims, 4 Drawing Sheets

METHOD FOR OPERATING A MASS FLOW METER

BACKGROUND OF THE INVENTION

1. Field of the Invention

This invention relates to a method for operating a mass flowmeter that employs the Coriolis principle and encompasses a measuring tube through which flows a medium, wherein the measuring tube is stimulated into oscillating, and the resulting oscillatory response of the measuring tube is measured.

2. Description of Prior Art

A similar method has been described earlier for instance in DE 100 02 635 A1. According to that document, the measuring tube is stimulated in three mutually different oscillating modes, and by means of the recorded oscillatory response pattern of the measuring tube, the characteristic values of the mass flowmeter such as its zero point and its sensitivity are determined during the operation of the mass flowmeter with the aid of a mathematical-physical model.

Determining the zero point and sensitivity as the characteristic values during the operation of the mass flowmeter essentially serves the purpose of improving the accuracy of the mass flow measurements. But with a Coriolis-type mass flowmeter, it is additionally possible to measure the pressure of the medium flowing through the measuring tube. One approach frequently employed to that effect in conventional mass flowmeters has been to measure the expansion of the measuring tube, for instance with the aid of strain gauges. The pressure value thus obtained as an additional measured variable can be used, for instance, to correct for pressure-induced errors in other quantities to be measured. To be sure, this always requires additional pressure-measuring provisions such as the aforementioned strain gauges.

SUMMARY OF THE INVENTION

It is therefore the objective of this invention to introduce a method for operating a mass flowmeter in which, in elegant fashion, the pressure in the measuring tube can be determined without any additional devices. Expanding on the above-described method, this objective is achieved by determining the pressure of the medium flowing through the measuring tube in that the detected oscillatory response is evaluated with the aid of a physical-mathematical model for the dynamics of the mass flowmeter.

Specifically, according to the invention, the measuring tube is caused to oscillate by an excitation that can vary substantially depending on the intended application, for instance a stimulation at one or two mutually different frequencies and/or one or two mutually different natural oscillating modes, whereupon the oscillatory response of the measuring tube is collected, and by means of a physical-mathematical model that reflects the oscillatory response to a predefined oscillation stimulation, the pressure in the measuring tube is calculated.

Specifically, one preferred embodiment of the invention provides for the use of at least a second-order physical-mathematical model for the dynamics of the mass flowmeter. Incidentally, it should be noted that in addition to the described oscillation excitation modes for the measuring tube at one or two mutually different frequencies and/or in one or two mutually different natural oscillating modes it is possible, of course, to generate oscillations at other additional frequencies and/or natural oscillating modes. What matters is that the physical-mathematical model employed is capable of providing information on the expected oscillatory response to a predefined oscillation excitation of the measuring tube.

Accordingly, in a preferred embodiment of the invention, the physical-mathematical model is capable of describing the oscillations of the mass flowmeter upon stimulation of the measuring tube in at least one natural oscillating mode. Any natural oscillating mode will serve the purpose, especially the first and second natural oscillating modes. Another preferred implementation of the invention provides for the physical-mathematical model to include the coupling between the first natural oscillating mode and the second natural oscillating mode of the oscillations of the measuring tube.

There are many possible approaches to measuring the pressure with the aid of such a physical-mathematical model. In one preferred embodiment of the invention, however, the physical-mathematical model factors in the effective elastic rigidity of the measuring tube. A preferred, enhanced embodiment of the invention includes an operational stimulation and an additional excitation in the first natural oscillating mode of the measuring tube, and a quantification of the effective elastic rigidity of the measuring tube when oscillating in the first natural oscillating mode by means of the resonant frequency of the medium-conducting measuring tube in its first natural oscillating mode, as determined via the operational stimulation and the oscillatory response to the additional excitation. The term "operational stimulation" refers to the excitation of the measuring tube of the Coriolis mass flowmeter for "normal" operation, i.e. for the actual mass flow measurement. The term "additional excitation" as used herein, therefore, refers to an excitation other than the "operational stimulation", serving to generate additional oscillatory responses.

In another preferred embodiment of the invention, two additional excitations take place in the first natural oscillating mode of the measuring tube, and the effective elastic rigidity of the measuring tube when oscillating in its first natural oscillating mode is determined on the basis of the oscillatory responses to these two additional excitations.

As an alternative, another preferred implementation of the invention provides for two additional excitations to take place in the second natural oscillating mode of the measuring tube, and the effective elastic rigidity of the measuring tube when oscillating in its second natural oscillating mode is determined via the oscillatory responses to the two additional excitations.

Using the physical-mathematical model alone already permits a very precise determination of the pressure in the measuring tube of a Coriolis mass flowmeter. In a preferred embodiment of the invention, however, the determination of the pressure additionally takes into account other factors affecting the dynamics of the measuring tube such as the movement of the support pipe and/or the suspension, if any, of the measuring tube. Also, in another preferred embodiment of the invention, the temperature in the mass flowmeter can be measured to allow compensation for the temperature dependence of the function of certain components of the mass flowmeter system such as an oscillation generator for the measuring tube and/or an oscillation sensor for the measuring tube.

In a preferred implementation of the invention, the temperature of the measuring tube is also measured to allow for thermally induced changes in the elastic rigidity of the measuring tube to be taken into account when quantifying the pressure. Finally, a preferred embodiment of the invention also factors into the pressure measurement the mechanical stress of the measuring tube and/or of a support pipe by detecting sensitivity variations in the elastic rigidity for the natural oscillating modes of the measuring tube, or by using strain gauges.

There are numerous ways in which the novel method for operating a Coriolis mass flowmeter can be configured and further enhanced. In this context, attention is invited to the independent patent claims and to the following detailed description of preferred embodiments of the invention with reference to the attached drawings.

DESCRIPTION OF THE PREFERRED EMBODIMENT

As has been explained further above, conventional Coriolis mass flowmeters detect pressure-related changes in the measuring tube with the aid of traditional expansion-measuring techniques, employing for instance strain gauges. The pressure value thus obtained as an additional measured variable can be used to correct for pressure-induced errors in other quantities to be measured. According to the invention, however, the pressure is measured without any additional devices, instead utilizing existing components already serving to quantify the response pattern of the Coriolis mass flowmeter upon oscillatory stimulation.

According to the invention, the measuring tube acts as a pressure-indicating membrane whose resilience varies as a function of the pressure in the measuring tube. This variation is detected as a measure of the pressure and is recorded. In the preferred embodiments of the invention described below, the basic concept involves performing a specifically targeted stimulation of the measuring tube of the Coriolis mass flowmeter and an evaluation of the oscillatory response in such fashion that the stress pattern of the measuring tube as a function of the pressure in the measuring tube is measured via the effective elastic rigidity of the measuring tube in at least one natural oscillating mode.

Figure 1:
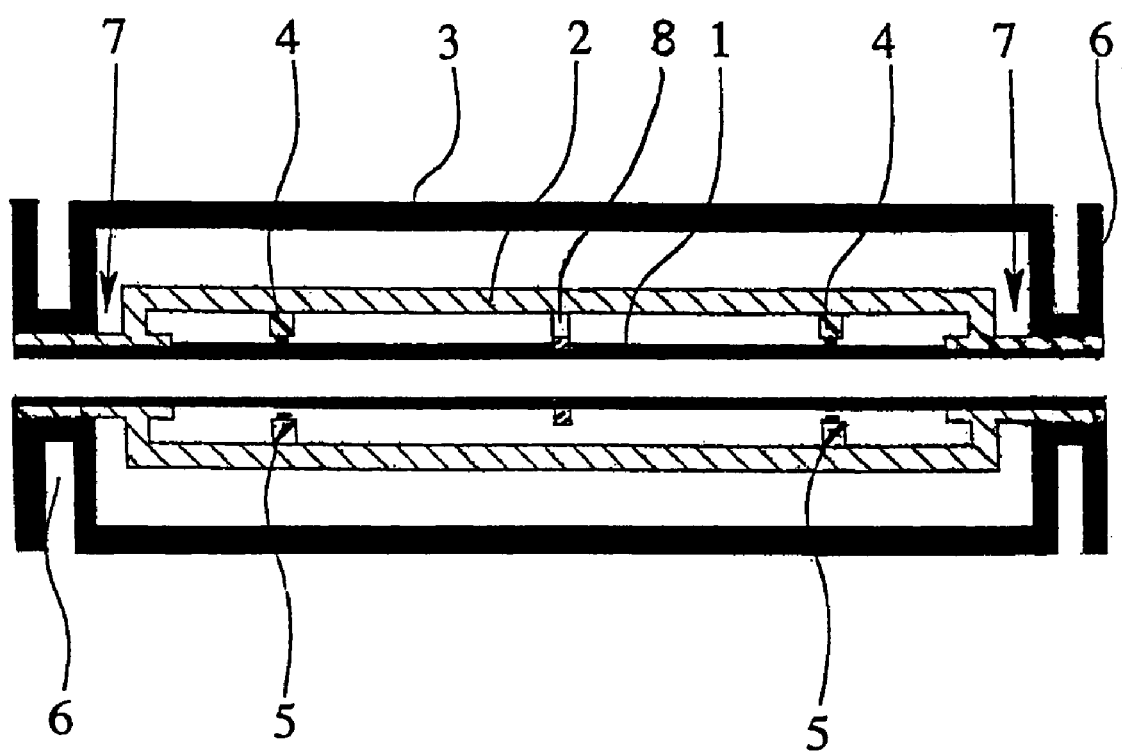
FIG. 1 is a schematic illustration of the mechanical configuration of a Coriolis mass flowmeter for use with the respective method according to the preferred embodiments of the invention.

FIG. 1 is a schematic illustration, to wit a longitudinal sectional view, of a Coriolis mass flowmeter, showing its mechanical configuration that lends itself to the method here described and applied in the preferred embodiments. It should be pointed out that the method according to this invention is not limited to the Coriolis mass flowmeter configured as shown in FIG. 1. On the contrary, essentially any tube geometries including designs with only one oscillation generator or even dual-tube configurations can be employed.

The FIG. 1 Coriolis mass flowmeter encompasses a measuring tube 1, a support pipe 2 and a protective tube 3, two oscillation generators 4 and two oscillation sensors 5. The one measuring tube 1 is of a straight linear design and the Coriolis mass flowmeter depicted in FIG. 1 can be installed, with flanges 6, an existing pipeline system, not illustrated. The connection between the flanges 6 and the system consisting of the measuring tube 1 and the support pipe 2 is in the form of mounting sections referred to as suspensions 7. In addition, a central spring 8 provided in the center of the measuring tube 1 connects the measuring tube with the support pipe to enhance the rigidity of the measuring tube 1, as described, for instance, in DE 42 00 060 A1.

Figure 2:
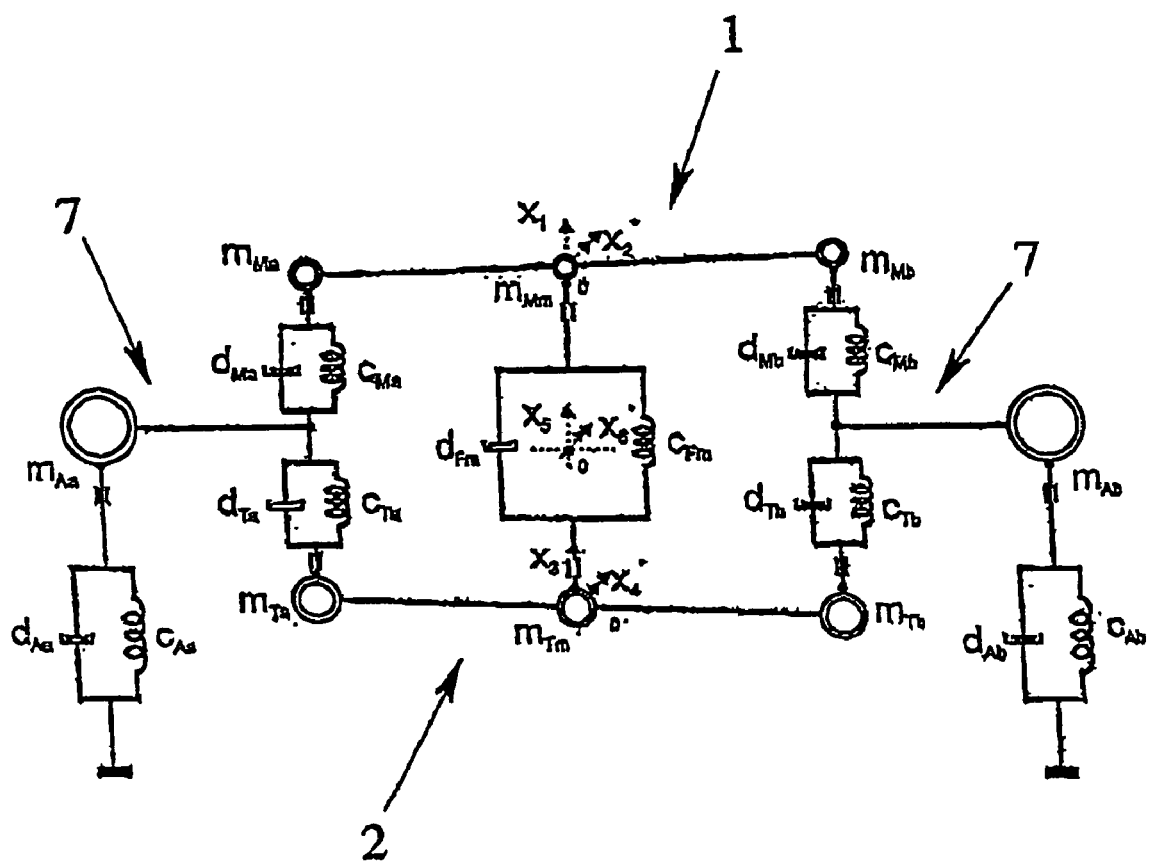
FIG. 2 shows one approach to the physical-mathematical model, with concentrated substitute elements, according to the invention.

FIG. 2 shows a model insert, designed for the physical-mathematical model employed in this case, with concentrated substitute elements of the FIG. 1 Coriolis mass flowmeter. The significant mechanical movements of the Coriolis mass flowmeter as shown in FIG. 1 represent the oscillations of the measuring tube 1 and the support pipe 2 in the first natural oscillating mode and in the second natural oscillating mode. They can be described on the basis of the oscillation pattern of the model shown in FIG. 2. The substitute elements marked M describe the respective effective mass, spring and attenuator of the measuring tube 1; the elements marked T describe the corresponding parameters of the support pipe 2. The substitute elements marked A for the respective mass, spring and attenuator are the substitute elements for the suspensions 7. The indices A and B represent the left and, respectively, the right half of the measuring tube 1, the support pipe 2 and the suspensions 7. The spring and attenuator marked Fm account for the fact that the measuring tube 1 is held in a central position by the central spring 8. Of course, in the absence of a central spring, the corresponding references do not apply. The respective mass marked m accounts for the fact that a larger mass is involved in the oscillations in the first natural oscillating mode of the measuring tube 1 and of the support pipe 2 than in the oscillations of the second natural oscillating mode.

Corresponding to this model of an oscillation in the first natural oscillating mode is the cophasal translational movement of the respective mass of the measuring tube 1, the support pipe 2 and the suspensions 7. One rotation of the outer masses a and b around the axis of rotation $x_2$ and $X_4$ corresponds to one oscillation in the second natural oscillating mode. The mathematical description of the oscillation pattern of this system can be derived with the aid of the 2nd Lagrange equation.

Assuming that the oscillations of the measuring tube 1 in its natural oscillating modes are mutually decoupled, that the movements of the support pipe 2 are ignored and that the suspension does not move, the simplest model for the pressure measment can be a 2nd order model that describes the oscillations of the measuring tube 1 only in its natural oscillating modes v=1, 2, 3 etc. The correlated transfer function is as follows:

$$G_v(s) = \frac{k_v s}{s^2 + 2d_v \omega_{0v} s + \omega_{0v}^2} \tag{1}$$

An example of the parameters of this transfer function for the first natural oscillating mode is this:

$$k_1 = \frac{1}{m_{Ma} + m_{Mb} + m_{Mm}} = \frac{1}{m_1} \tag{2}$$

-continued $$\omega_{01} = \sqrt{\frac{c_{Ma} + c_{Mb} + c_{Fm}}{m_{Ma} + m_{Mb} + m_{Mm}}} = \sqrt{c_1 k_1} = \sqrt{\frac{c_1}{m_1}} \quad (3)$$

$$d_1 = \frac{1}{2} \frac{d_{Ma} + d_{Mb} + d_{Fm}}{\sqrt{(c_{Ma} + c_{Mb} + c_{Fm})(m_{Ma} + m_{Mb} + m_{Mm})}} \quad (4)$$

For the second natural oscillating mode it is:

$$G_2(s) = \frac{k_2 s}{s^2 + 2 d_2 \omega_{02} s + \omega_{02}^2} \quad (5)$$

For the parameters of these transfer functions it is:

$$k_2 = \frac{1}{m_{Ma} + m_{Mb}} = \frac{1}{m_2} \quad (6)$$

$$\omega_{02} = \sqrt{\frac{c_{Ma} + c_{Mb}}{m_{Ma} + m_{Mb}}} = \sqrt{c_2 k_2} = \sqrt{\frac{c_2}{m_2}} \quad (7)$$

$$d_2 = \frac{1}{2} \frac{d_{Ma} + d_{Mb}}{2\sqrt{(c_{Ma} + c_{Mb})(m_{Ma} + m_{Mb})}} \quad (8)$$

The elasticity constant $c_v$, is composed of the elasticity constants of the oscillator components the measuring tube 1, the support pipe 2, the central spring 8, etc. It depends on the respective module of elasticity of the components, their shape and their location and will vary with the variables pressure and temperature. Moreover, the oscillation amplitude and profile have an effect on the resiliency.

As a whole, the elasticity constant is a function of numerous process and measuring parameters:

$$c = f(T, \Delta T, \sigma, \Delta \sigma, P, \dot{m}, \hat{x}, \text{Formulation} \ldots) \quad (9)$$

This functional relationship between the influencing variables and the elasticity constant c is very complex and permits only limited description in analytical terms. Still, under certain conditions, it can be used for the indirect measurement of pressure as a process variable. For determining the elasticity constant $c_v$ and from it the process pressure, the Coriolis mass flowmeter is additionally stimulated at one or several frequencies, the transfer function is measured and, based on the result, the rigidity values $c_v$, are calculated. Appropriate calibration will establish the relation between the elasticity constants and the operating pressure. Described below are several preferred embodiments of the invention in both the first and second natural oscillating modes. They can be applied in corresponding fashion with other natural oscillating modes as well.

Determination of the Elastic Rigidity in the First Natural Oscillating Mode Via a Single Additional Excitation The defining equation for the elasticity constant $c_1$, is as follows:

$$c_1 = \omega_{01}^2 m_1. \quad (10)$$

The effective mass obtained via an additional excitation at the additional frequency $\omega_{ZI}$ after a few transformations will be:

$$m_1 = \frac{\omega_{ZI}}{(\omega_{01}^2 - \omega_{ZI}^2)} \cdot \frac{\text{Im}\{G_1(j\omega_{ZI})\}}{\text{Im}\{G_1(j\omega_{ZI})\}^2 + \text{Re}\{G_1(j\omega_{ZI})\}^2}. \quad (11)$$

Provided there is adequate separation between the additional excitation and the resonant frequency, the Equation (11) can be simplified to read:

$$m_1 = \frac{\omega_{ZI}}{\text{Im}\{G_1(j\omega_{ZI})\}\omega_{01}^2}, \quad (12)$$

while the elasticity constant is derived from:

$$c_1 = \frac{\omega_{ZI}}{\text{Im}\{G_1(j\omega_{ZI})\}}. \quad (13)$$

In selecting the frequency position of the additional excitations it is necessary to weigh the trade-off between the highest possible amplitude of the measuring signals—with the frequency response of the transfer function $G_1$ and, respectively, $G_2$ declining above and below the resonant frequency at—20[dB] per decade—and an adequate distance from the operating frequency $\omega_{ol}$ in order to ensure good signal discrimination. This also applies to the preferred embodiments of the invention described below.

Determining the Elasticity Constants Via Two Additional Excitations in the First Natural Oscillating Mode The parameter $c_1$ as a measure of the process pressure can be determined, corresponding to the operating frequency and without using the natural frequency, through excitation at a minimum of two additional frequencies in the first natural oscillating mode.

The defining equation for the mass $c_1$ is:

$$c_1 = \frac{\omega_{ZA}\omega_{ZB}}{\omega_{ZB}^2 - \omega_{ZA}^2} \frac{\omega_{ZB}\text{Im}\{G_1(j\omega_{ZA})\}}{\text{Im}\{G_1(j\omega_{ZA})\}^2 + \text{Re}\{G_1(j\omega_{ZA})\}^2} - \frac{\omega_{ZA}\omega_{ZB}}{\omega_{ZB}^2 - \omega_{ZA}^2} \frac{\omega_{ZA}\text{Im}\{G_1(j\omega_{ZB})\}}{\text{Im}\{G_1(j\omega_{ZB})\}^2 + \text{Re}\{G_1(j\omega_{ZB})\}^2}. \quad (14)$$

In theory, the position of the additional frequencies has no bearing on the pressure measurment. In reality, however, there is a minor dependence, making it desirable to tie the position of the additional frequencies to the operating frequency in symmetrically mirrored fashion.

The elasticity constants $c_v$, can in general be determined as a measure of the process pressure upon excitation at a minimum of two additional frequencies in the second or a higher natural oscillating mode.

The defining equation for the elasticity constant $c_v$ is:

$$c_v = \frac{\omega_{ZA}\omega_{ZB}}{\omega_{ZB}^2 - \omega_{ZA}^2} \frac{\omega_{ZB}\text{Im}\{G_v(j\omega_{ZA})\}}{\text{Im}\{G_v(j\omega_{ZA})\}^2 + \text{Re}\{G_v(j\omega_{ZA})\}^2} - \frac{\omega_{ZA}\omega_{ZB}}{\omega_{ZB}^2 - \omega_{ZA}^2} \frac{\omega_{ZA}\text{Im}\{G_v(j\omega_{ZB})\}}{\text{Im}\{G_v(j\omega_{ZB})\}^2 + \text{Re}\{G_v(j\omega_{ZB})\}^2}. \quad (15)$$

In the case of the additional excitations, one of the excitation frequencies could coincide with the resonant frequency of the mode concerned. However, the additional frequencies are preferably selected in a symmetrically mirrored position relative to the resonant frequency $\omega_{01}$.

It is generally possible to determine the value of the transfer function $G_v$, at a frequency $\omega$ for instance from the ratio between the oscillatory response $V_v$, and the oscillation stimulation $F_v$:

$$G_v(j\omega) = \frac{V_v(j\omega)}{F_v(j\omega)}. \quad (16)$$

The oscillation stimulation $F_v$, is a physical stimulation of the measuring tube 1 in its natural oscillating mode vfor instance by means of electromagnetic actuators. The oscillatory response $V_v$, represents the speed of the transverse movement of the measuring tube 1 in its natural oscillating mode, measured, for instance, via the induced voltages that are proportional to the speed, on one or several electromagnetic sensor or sensors. Other actuatiors and sensors may lead to a modified Equation (16). For example, sinusoidal signals $A_v$, from acceleration sensors can be converted into speed data in accordance with the following relationship:

$$V_v(j\omega) = \frac{1}{j\omega} A_v(j\omega) \quad (17)$$

Correspondingly, for sinusoidal signals $S_v$, for instance from optical sensors and proportionally reflecting lateral excursions, it will be:

$$V_v(j\omega) = j\omega \cdot S_v(j\omega). \quad (18)$$

Relationship Between Process Pressure P and Elasticity Constant $c_v$

The relationship between the elasticity constant $c_v$, and the process pressure P is:

$$p = f(c_v, T, \dots). \quad (19)$$

and in specific cases:

$$P = k_v \cdot c_v + k_{0v} \cdot c_{0v}(T). \quad (20)$$

The proportionality factor $k_v$, and, respectively, $k_{0v}$, is a design parameter which for a given natural oscillating mode can be viewed as a constant over a certain pressure-measuring range. It can also be established through calibration. The elasticity constant $C_{0v}$ is temperature-dependent and describes the zero point of the characteristic curve for the natural oscillating mode concerned. It can be corrected with the aid of the measured temperature.

In typical Coriolis mass flowmeters, the elasticity constants depend only to a minor extent on the oscillation amplitude and, accordingly, the effect of the oscillation amplitude on the pressure measurement can be ignored. For systems with a more dynamic amplitude and consequently greater amplitude dependence, an on-line correction of the oscillation amplitude is possible.

Compensation for Cross Sensitivities

The relationship between the elastic rigidity and the pressure in the measuring tube 1 is also affected by other process variables. Correction for the thermal effect on the elastic rigidity is possible by measuring the temperature of the measuring tube 1. The effect of stress distortions can be compensated for, where necessary, by determining the sensitivity variations of the elastic rigidity in the different natural oscillating modes or by installing in the Coriolis mass flowmeter tension indicators such as strain gauges.

Experimental Results

For experimental purposes, a vertically mounted Coriolis mass flowmeter was connected to a pressure-gauge test pump that is capable of generating static pressures up to a maximum of 60 bar (870 psi). About every ten minutes during the test, the pressure was set at a different value, which in each case remained essentially constant for a ten-minute time span (maximum pressure drop 2 bar (29 psi) after an initial pressure of 50 bar (725 psi)).

Figure 3:
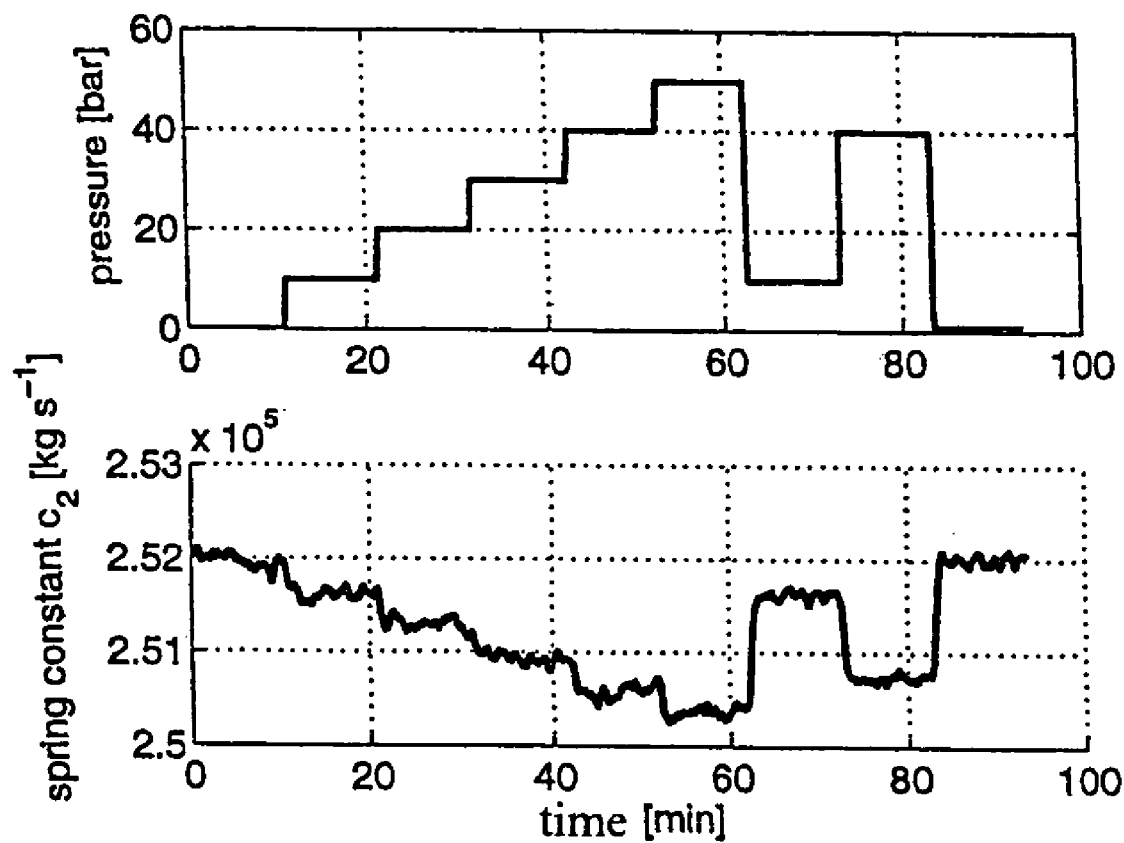
FIG. 3 shows the progression of the elastic rigidity in the first natural oscillating mode of the measuring tube of the FIG. 1 Coriolis mass flowmeter as a function of the operating pressure.
Figure 4:
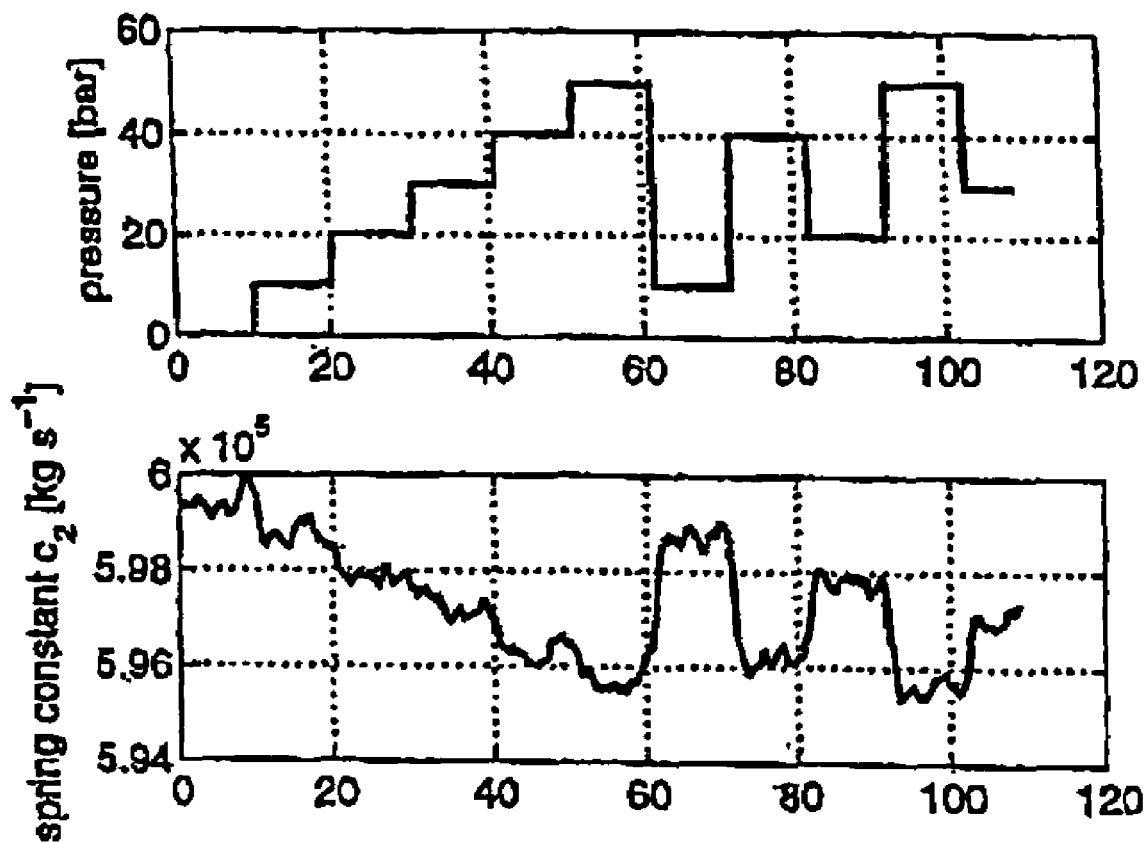
FIG. 4 shows the progression of the elastic rigidity in the second natural oscillating mode of the FIG. 1 measuring tube as a function of the operating pressure.

FIGS. 3 and 4 show the measured results obtained with distilled water as the medium flowing through the measuring tube 1. As is quite evident, the pressure-related change in the elastic rigidity is conspicuously detected by means of the model-based quantification of the elastic rigidity $c_v$.

The invention claimed is:

1. A method for operating a mass flowmeter that employs the Coriolis principle and encompasses a measuring tube through which flows a medium, which measuring tube is stimulated into oscillating and the resulting oscillatory response of the measuring tube is measured, including the step of gauging the pressure of the medium flowing through the measuring tube by evaluating the recorded oscillatory response on the basis of a physical-mathematical model for the dynamics of the mass flowmeter.

2. The method as in claim 1, including employing a physical-mathematical model at least of the 2nd order for the dynamics of the mass flowmeter.

3. The method as in claim 1 or 2, wherein the physical-mathematical model is capable of describing the oscillations of the mass flowmeter upon excitation of the measuring tube in at least one natural oscillating mode.

4. The method as in claim 1 or 2, wherein the physical-mathematical model takes into account the coupling between a first natural oscillating mode and another natural oscillating mode of the oscillations of the measuring tube.

5. The method as in claim 1 or 2, wherein the physical-mathematical model takes into account the effective elastic rigidity values of the natural oscillating modes, described by the model, of the oscillations of the measuring tube.

6. The method as in claim 5, wherein an operational stimulation and an additional excitation are provided in one natural oscillating mode of the measuring tube and the effective elastic rigidity of the measuring tube when oscillating in that natural oscillating mode is measured via the resonant frequency, as established by the operational stimulation, of the medium-conducting measuring tube in the said natural oscillating mode and the oscillatory response to the additional excitation is collected.

7. The method as in claim 5, wherein two additional excitations are provided in one natural oscillating mode of the measuring tube and the effective elastic rigidity of the measuring tube when oscillating in this natural oscillating mode is quantified by means of the oscillatory responses to these two additional excitations.

8. The method as in claim 1 or 2, wherein, in determining the pressure, the method takes into account additional factors influencing the dynamics of the measuring tube, such as the movement of the support pipe and/or the influencing factors of a suspension of the measuring tube.

9. The method as in claim 1 or 2, wherein the temperature in the mass flowmeter is measured so as to take into account the temperature dependence of the functions of devices in the mass flowmeter such as an oscillation generator for the measuring tube and/or an oscillation sensor for the measuring tube.

10. The method as in claim 1 or 2, wherein the temperature of the measuring tube is measured so as to take into account, in the determination of the pressure, a thermally induced change in the elastic rigidity of the measuring tube.

11. The method as in claim 1 or 2, wherein the mechanical stress on the measuring tube and/or on a support tube is detected via sensitivity variations of the elastic rigidity for the natural oscillating modes of the measuring tube or through strain gauge measurements and is taken into account in the pressure measurements.

* * * * *